Sept. 5, 1950       S. O. MORRISON       2,521,645
REFRIGERATION UNIT VIBRATION MOUNTING
Filed June 26, 1946
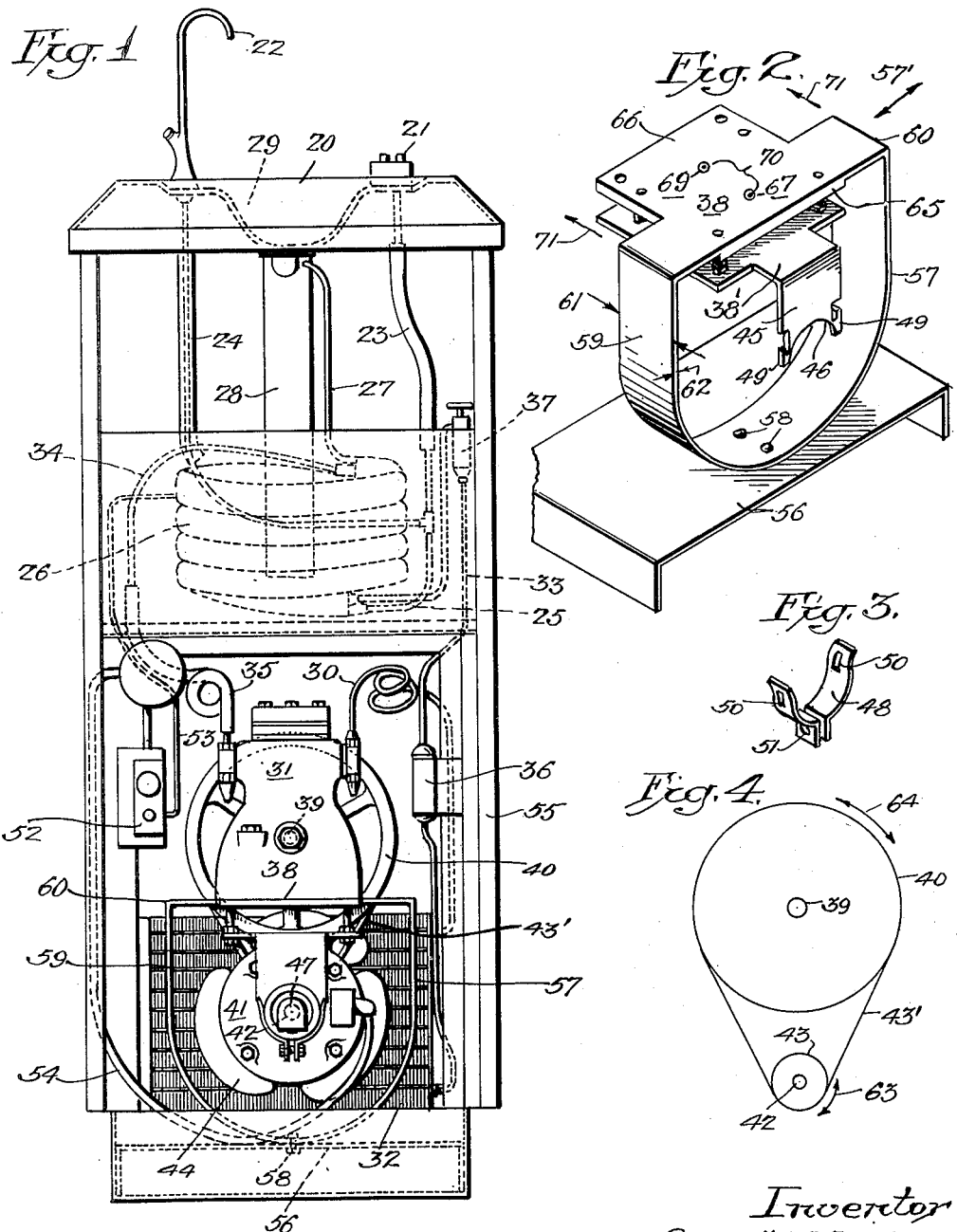
Inventor
Samuel O. Morrison
by
Attorneys Patented Sept. 5, 1950

2,521,645

UNITED STATES PATENT OFFICE 2,521,645

REFRIGERATION UNIT VIBRATION MOUNTING

Samuel O. Morrison, Media, Pa., assignor to Sunroc Refrigeration Company, Dover, Del., a corporation of Delaware Application June 26, 1946, Serial No. 679,504

9 Claims. (Cl. 62—169.1)

My invention relates to vibration mountings and to refrigeration devices involving such mountings.

A purpose of my invention is to simplify and cheapen vibration mountings for machinery and the like which generates vibrations and particularly for electric motors and compressors driven by such motors for electric refrigeration, especially in water coolers.

A further purpose is to avoid the necessity for increased bulk and complexity of mechanism incident to vibration mounting.

A further purpose in a refrigeration device is to provide a resilient metallic U-shaped member, means for supporting the member at the center of the U while leaving the remainder free to vibrate, a support secured to the ends of the U and a refrigeration unit mounted on the support, preferably a motor and a compressor driven by the motor mounted respectively one above and one below the support, the motor and compressor each having shafts transverse to the plane of the U.

A further purpose in a refrigeration unit is to employ a resilient metallic U-shaped member, means for supporting the member upright at the center of the U while leaving the remainder free to vibrate, a support secured to the ends of the U, a motor and a compressor driven by the motor mounted respectively one above and one below the support, preferably with the motor secured to the support and extending below the support within the U and the compressor driven by the motor secured to the support and extending above the support, the motor and the compressor each having a shaft transverse to the axis of the U.

A further purpose is to employ a U-shaped member of strip form having the major cross-sectional dimension of the strip transverse to the plane of the U.

A further purpose in a vibration mounting is to provide a U-shaped resilient metallic member, preferably of strip form having its major cross-sectional dimension transverse to the plane of the U, means for supporting the member preferably in upright position and at the center of the U while leaving the remainder free to vibrate, a support secured to the ends of the U and a unit mounted on the support, preferably a driving unit and a driven unit operatively connected and respectively mounted one above and one below the support and preferably each having shafts whose axes are transversed to the plane of the U.

A further purpose is to dissipate the vibration incident to starting of machinery by lateral deflection of the ends of the U in the plane of the U.

A further purpose is to load the ends of the U laterally in any of the mechanisms referred to, preferably by locating the centers of gravity of the machinery units with respect to the support and preferably also the support noncentrally with respect to the U so as to aid in reducing or damping the vibration which otherwise would occur.

Further purposes appear in the specification and in the claims.

In my drawings I have chosen to illustrate one only of the numerous possible embodiments of the invention, choosing the form shown from the standpoint of satisfactory illustration, convenient operation and clear demonstration of the principles involved.

Figure 1 is a partially diagrammatic side elevation of a mechanical refrigeration device to which my invention has been applied.

Figure 2 is an isolated perspective view of the U-shaped member and support of the present invention.

Figure 3 is a perspective view of a portion of the motor hanger.

Figure 4 is a diagrammatic section parallel to the belt showing the driving connection between the units.

In the drawings like numerals apply to like parts.

In many types of machinery vibration is a serious factor, not only in the operation and maintenance of the equipment itself, but in the operation and maintenance of adjacent equipment and, where the equipment is used in offices, homes and light industrial establishments, vibration frequently seriously interferes with the comfort of the personnel. Accordingly it has been common to take special precautions, such as by the use of cushions or spiral-spring suspended platforms, especially in electric refrigeration and similar devices which are widely distributed in offices and homes. Many of these prior art vibration mountings used to suppress vibration or prevent its transmission to other equipment, are bulky and expensive, or involve numerous spring adjustments or similar features likely to get out of order.

By the present invention I have produced an extremely cheap, simple and rugged vibration mounting, especially suited to electric refrigeration particularly of the type employed in water coolers, but suitably applicable to any other type of machinery or equipment.

In the preferred embodiment shown in Figure 1, the electric water cooler 20 is provided with a bubbler 21 and a drinking glass filler 22 supplied with refrigerated water through piping 23 and 24 respectively from an outlet pipe 25 of the heat transfer cooling coil 26 having separate interior passages, not shown, for refrigerant and drinking water. Inlet for water to the heat transfer cooling coil suitably is provided by a pipe 27 which passes from a water inlet connection not shown through a precooling device 28 which cools the inlet water by cool waste water flowing from the collecting basin 29.

Refrigerant leaves the high side 30 of a refrigeration compressor 31 and passes through a heat transfer condenser 32 and from thence by pipe 33 enters the heat transfer cooling coil 26, passing through the refrigeration passages thereof and leaving the cooling coil by the pipe 34 which enters the low side 35 of the compressor 31. The mechanism is desirably provided with a strainer 36 and a restrictor 37. It will be understood of course that the detail of the refrigeration mechanism is not important from the standpoint of the present invention, and is described merely as one form of suitable refrigeration unit.

The compressor is mounted on a support 38, suitably of platform type as shown in Figure 2, as by bolts, and suitably provided with a lower spaced platform 38' forming part of the support 38, and united thereto as by bolts. The compressor is suitably driven by a compressor shaft 39 carrying a pulley 40. The support 38, by the auxiliary platform 38', also mounts, as by suitable bolts, an electric motor 41 having a central shaft 42 carrying a pulley 43 which connects by a belt 43' with the pulley 40 on the compressor so that the electric motor drives the compressor. Beyond the pulley 43 on the electric motor shaft 42, a fan 44 is desirably provided to cool the condenser 32. The mounting of the motor is preferably facilitated by a bracket extension 45 extending down from the auxiliary platform 38' to engage at 46 the upper portion of a bearing 47 of the motor shaft 42, while the lower part of the bearing is engaged by straps 48 which anchor in ears 49 of the bracket extension 45 by engagement in recesses 50, the bottom of the straps being suitably locked through bolt holes 51. An electric connection to the motor from the thermostatic controller 52 having a thermostatic element 53 is made by the electric lead 54.

It will be evident that the driving shaft of the motor and the driven shaft of the compressor are parallel one to another and transverse to the plane of the paper in Figure 1.

The electric refrigerator or water cooler has a casing 55 supported on a base 56 which also provides support for a U-shaped vibration mounting 57, which preferably is upright as shown in Figures 1 and 2, and supported only at the center of the base of the U as by bolts 58 into the base 56. It will be noted that the arms 59 of the U and all other parts of the U are free from attachment to or engagement by any of the structure, so that the ends of the U can vibrate as demanded and particularly can vibrate in the direction of the arrows 57' shown in Figure 2. The support 38 cross connects the arms of the U preferably at their ends and is united thereto as by welding at 60. All connections from rigid parts of the equipment to the mechanism mounted on the support 38 is resilient or flexible, particularly the electric lead 54 to the electric motor, and the piping at 30 and 35 to the compressor, so that the parts are not substantially restrained against free vibration.

It will be evident that in the preferred form shown the plane of the U is the plane through the center thereof, parallel to the plane of the paper in Figure 1, and that the axes of the driving and driven shafts respectively of the motor and compressor are transverse to the plane of the U.

The U is preferably of strip cross section, with the major cross sectional dimension 61 (Figure 2) transverse to the plane of the U and the minor cross sectional dimension 62 in the plane of the U, and the tendency of the U to vibrate transverse to the plane of the U will be substantially less than the tendency to vibrate in the plane of the U.

In the preferred set up of the driving and driven unit on the U-shaped vibration mounting, the axis of rotation as previously explained is transverse to the plane of the U. This means that the torque involved in the rotatory effort about such axis is in the plane of the U or parallel thereto, and inequalities of torque incident to acceleration or deceleration involved in starting or stopping or due to normal cyclic fluctuations or abnormalities in the operation of the device can expend themselves in vibration of the arms of the U in the direction of the arrows 57' shown in Figure 2.

Considering the diagrammatic view of Figure 4, if the driving shaft 42 driving the pulley 43 causes any fluctuation in torque, this fluctuation will be in the direction of the arrows 63. Likewise if any fluctuation occurs in the application of torque by the belt 43' to the pulley 40 or in the cycle of the compressor to produce nonuniform rotation of the shaft 39 of the compressor, such variation in torque will be in the direction of the arrows 64. Both of these torque variations are in the plane of the U or parallel thereto and can express themselves in vibration of the arms of the U in the direction of the arrows 57' of Figure 2. A further feature which is considered to be quite advantageous is that the driving unit and the driven unit are respectively above and below the support 38, so that especially during acceleration and deceleration some vibratory forces can cancel out without adding to the vibratory effect on the arms of the U, thus simplifying the problem.

While the U-shaped member is free to vibrate and in a sense functions as a spring, being of material suitably light in section to respond readily to vibration, for example of the order of $\frac{1}{16}$ to $\frac{1}{8}$ inch thick in the smaller cross sectional dimension 62 where employed on a standard water cooler refrigeration unit, it will be understood that it is not necessary, nor in most cases is it even advantageous to employ a recognized spring material for the U-shaped member. Very good results have been obtained using steel of the order of SAE 1015 or SAE 1020 for the U-shaped member, having of course a carbon content so low that the material would not normally be considered to be a spring steel. This has the advantage of facilitating welding and forming. Of course if preferred a material of recognized spring steel grade, such as SAE 1050 to SAE 1095 inclusive might be used. It is not even necessary that the U-shaped member be made of steel, as other suitable alloys such as copper base alloys, aluminum base alloys or magnesium base alloys may be used, provided there is adequate structural strength to support the weight and vibratory load, and adequate resilience to permit vibration in the section used.

In general for standard domestic refrigeration units it is not considered necessary to employ sections thicker than approximately ¼ inch in the smaller cross sectional dimension 62. The major cross sectional dimension 61 may of course vary widely, and good results have been obtained with major cross sectional dimensions of approximately 3 inches.

One feature of the invention which is found to be valuable is the cross connection between the arms of the U provided by the support 38, thus causing the arms of the U to vibrate together and preventing the arms of the U from functioning as free vibrating members as in a tuning fork. Thus while the vibration of the arms of the U may be analogous to a tuning fork, it is considerably modified due to the fact that vibratory force is applied by a cross connection between the arms which serves as a structural mounting for vibrating machinery units, suitably a driving unit and a driven unit, and respectively located one inside the U and one outside or beyond the U.

A further important feature of the invention is to load the arms of the U laterally in any of the mechanism discussed so as to reduce or damp the vibration which would otherwise occur. This can most conveniently be done by arranging the support 38 noncentrally, with little or no overhang beyond the U at the side 65, and a considerable lateral extension 66 at the opposite side, so that the center of gravity of the driving unit or motor and of the driven unit, suitably the compressor, instead of being at some point such as 67 in the plane of the U, will be displaced laterally with respect to the center plane of the U and preferably located outside the U, as for example above and below a point 69, due to the lateral off set of the support and the driving and driven unit mounted on the support. Since the motor and compressor are of considerable weight, there is a lateral bending moment on the arms of the U about the lever arm 70 (equal to the perpendicular distance of the central plane of the U from the parallel plane of the centers of gravity of the machinery units, where these latter are in the same plane), equivalent to a force on the arms of the U in the direction of the arrows 71, tending to deflect the arms away from the plane of the U.

This, I have demonstrated experimentally, tends to reduce or damp the vibration from a given nonuniform operation of the driving and driven units. It will be obvious of course that any other means of applying a lateral force on the arms of the U other than the off-center positioning of the driving and driven units may be employed.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. In a refrigeration device, a resilient metallic U-shaped member having arms which are resilient, means for supporting the member at the center of the U, leaving the arms free to vibrate, a support secured to the arms of the U, a motor and a compressor driven by the motor mounted respectively one above and one below the support, the motor and compressor each having shafts transverse to the plane of the U.

2. In a refrigeration device, a resilient metallic U-shaped member having arms which are resilient, means for supporting the member upright at the center of the U, leaving the arms free to vibrate, a support secured to the arms of the U, a motor and a compressor driven by the motor mounted respectively one above and one below the support.

3. In a refrigeration device, a resilient metallic U-shaped member having arms which are resilient, means for supporting the member upright at the center of the U, leaving the arms free to vibrate, a support secured to the arms of the U, a motor secured to the support and extending below the support within the U and a compressor driven by the motor secured to the support and extending above the support, the motor and the compressor each having a shaft transverse to the plane of the U.

4. In a refrigeration device, a U-shaped resilient metallic strip having arms which are resilient and having its major cross-sectional dimension transverse to the plane of the U, means for supporting the member upright at the center of the U, leaving the arms free to vibrate, a support secured to the arms of the U, a motor and a compressor driven by the motor mounted respectively one above and one below the support.

5. In a vibration mounting, a U-shaped resilient metallic member having arms which are resilient, means for supporting the member in upright position at the center of the U, leaving the arms free to vibrate, a support secured to the arms of the U, a driving unit and a driven unit operatively connected and respectively mounted one above and one below the support.

6. In a vibration mounting, a U-shaped resilient metallic strip having arms which are resilient and having its major cross-sectional dimension transverse to the plane of the U, means for supporting the member in upright position at the center of the U, leaving the arms free to vibrate, a support secured to the arms of the U, a driving unit and a driven unit operatively connected and respectively mounted one above and one below the support.

7. In a vibration mounting, a U-shaped resilient metallic member having arms which are resilient, means for supporting the member in upright position at the center of the U, leaving the arms free to vibrate, a support secured to the arms of the U, a driving unit having a shaft and a driven unit having a shaft operatively connected to the shaft on the driving unit, the units being respectively mounted one above and one below the support and the shaft axes being transverse to the plane of the U.

8. In a refrigeration unit, a support, a metallic U-shaped member having arms secured adjacent their ends to the support, means for positioning the U-shaped member by attachment adjacent the center of its base while the arms of the U are free to vibrate, a driving unit and a driven refrigeration unit mounted respectively on opposite sides of the support and each having an operating shaft transverse to the plane of the U, the centers of gravity of the driving unit and the driven refrigerating unit being both offset laterally on the same side of the U with respect to the central plane of the U to apply lateral force to the arms of the U.

9. In a vibration mounting, a metallic U-shaped member having arms and positioned upright, means for supporting the U-shaped members adjacent the center of the base with the arms free to vibrate, a support connecting the arms of the U, a driving unit and a driven unit each having a shaft transverse to the plane of the U, mounted respectively above and below the support and operatively interconnected, the centers of gravity of the driving and driven unit being laterally displaced with respect to the center of the U to apply a lateral force on the arms of the U.

SAMUEL O. MORRISON.

REFERENCES CITED

The following references are of record in the file of this patent:

UNITED STATES PATENTS

| Number | Name | Date |
|---|---|---|
| 1,439,044 | White | Dec. 19, 1922 |
| 1,526,882 | Trimmer | Feb. 17, 1925 |
| 1,591,940 | Joyce | July 6, 1926 |
| 1,815,170 | Summers | July 21, 1931 |
| 1,953,473 | Fedders | Apr. 3, 1934 |
| 2,036,098 | Pieper et al. | Mar. 31, 1936 |
| 2,078,445 | Geyer | Apr. 27, 1937 |
| 2,140,305 | Ashley et al. | Dec. 13, 1938 |